US006739734B1

(12) United States Patent
Hulgan

(10) Patent No.: US 6,739,734 B1
(45) Date of Patent: May 25, 2004

(54) LED RETROFIT METHOD AND KIT FOR CONVERTING FLUORESCENT LUMINARIES

(75) Inventor: Condon "Sparky" Hulgan, Gilbert, AZ (US)

(73) Assignee: Ultimate Presentation Sytems, Inc., Tempe, AZ (US)

( * ) Notice: Subject to any disclaimer, the term of this patent is extended or adjusted under 35 U.S.C. 154(b) by 0 days.

(21) Appl. No.: 10/389,004

(22) Filed: Mar. 17, 2003

(51) Int. Cl.⁷ .............................................. F21V 13/10
(52) U.S. Cl. ....................... 362/243; 362/217; 362/225; 362/800
(58) Field of Search .................. 362/217, 224, 362/225, 227, 234, 240, 241, 247, 243, 253, 147, 148, 800, 812, 317, 347, 349

(56) References Cited

U.S. PATENT DOCUMENTS

| | | | | |
|---|---|---|---|---|
| 4,669,033 A | * | 5/1987 | Lee | 362/217 |
| 5,613,761 A | * | 3/1997 | Raby et al. | 362/217 |
| 5,921,667 A | * | 7/1999 | Raby et al. | 362/346 |
| 6,092,913 A | * | 7/2000 | Edwards, Jr. | 362/260 |
| 6,283,612 B1 | * | 9/2001 | Hunter | 362/240 |
| 2003/0102810 A1 | * | 6/2003 | Cross et al. | 315/74 |

* cited by examiner

*Primary Examiner*—Sandra O'Shea
*Assistant Examiner*—Hargobing S. Sawhney
(74) *Attorney, Agent, or Firm*—Scott A. Hill

(57) ABSTRACT

The present invention is a method of converting fluorescent luminaries, or luminaries, into LED luminaires. The most preferred method retrofits a commercial fluorescent light fixture, especially one that uses T12 lamps or T8 lamps, without requiring removal of the fixture housing. The fluorescent luminaire is stripped of its lamps, wireway cover, ballast(s) and tombstones. A novel LED retro-reflector is mounted within the fixture housing to conceal an LED power supply and to provide an ideal surface for mounting LED (Light Emitting Diode) light strips. Any existing diffuser or louver that was part of the fluorescent luminaire may be replaced after the LED retrofit has been completed.

14 Claims, 3 Drawing Sheets

LED RETROFIT METHOD AND KIT FOR CONVERTING FLUORESCENT LUMINARIES

BACKGROUND OF THE INVENTION

Incandescent light bulbs are seldom used in commercial lighting applications because about 95% of the input energy generates heat, not light. Commercial fluorescent fixtures have replaced incandescent fixtures in offices because fluorescent fixtures, such as troffers and surface boxes, are more cost efficient and provide exceptional light. The most common fluorescent fixtures used today are lay-in-troffers, usually 2×4 foot, which lay into a suspended ceiling. There is nothing particularly wrong with the troffers, but the fluorescent lamps, most commonly 4 foot T12 or T8 tubes, have many drawbacks that are considered acceptable because there have been no alternatives that are cost-effective.

Fluorescent lamps are long tubes that contain mercury and argon gas. Electrodes sealed into each end of a tube allow the lamp to conduct an electric current, thereby emitting ultra-violet radiation. The tube of a fluorescent lamp is a glass envelope. The inside surface of the tube is coated with a phosphor that provides visible illumination when excited by ultra-violet radiation. The phosphor, or fluorescent coating, may be harmful to a person's eyes. The glass envelope is infamous for its ability to shatter and blanket an area with sharp glass. The neurological toxicities associated with mercury exposure are well documented. Additionally, only a portion of the radiation produced by a fluorescent lamp is ever converted into visible light. As with incandescent light bulbs, the excess radiation produces heat. Collectively, the heat generated by these lamps places a tremendous burden on the air conditioning system of a building, especially during the summer months in warmer climates. There is a need for a more energy efficient luminaire that does not include all of the hazards of fluorescent lamps.

SUMMARY OF THE INVENTION

The benefits of what are commonly referred to as white LEDs are becoming increasingly known. Some examples of white LEDs are shown and described in U.S. Pat. Nos. 6,163,038 and 6,303,404, incorporated herein by reference but not limitation. White LEDs are much more energy efficient than fluorescent lamps, do not generate very much heat, and provide illumination that presents colors more closely to the way they look in natural sunlight. Additionally, white LED light tends to increase scotopic sensitivity, thereby increasing the perceived brightness of a room without producing an uncomfortable work environment.

The present invention is a method for converting fluorescent luminaires into LED luminaires. The method will retrofit a commercial fluorescent fixture without requiring removal of the fixture housing. First, a fluorescent luminaire is stripped of its lamps, wireway cover, ballast(s) and tombstones. A novel LED retro-reflector is mounted to the fixture housing. LED (Light Emitting Diode) light strips are pre-assembled to a lighted surface of the LED retro-reflector. The LED retro-reflector also conceals an LED power supply that has also been mounted to the fixture housing.

The lighted surface of the LED retro-reflector is preferably a highly reflective white, but some of the more common white LED lamps are designed so that there is little or no need for a separate reflector to redirect light. When such white LED lamps are used, the LED retro-reflector should still be white, but does not necessarily need to be highly reflective. Any existing diffuser or louver that was part of the fluorescent luminaire may be replaced after the LED retrofit has been completed.

DETAILED DESCRIPTION OF THE INVENTION

Figure 1:
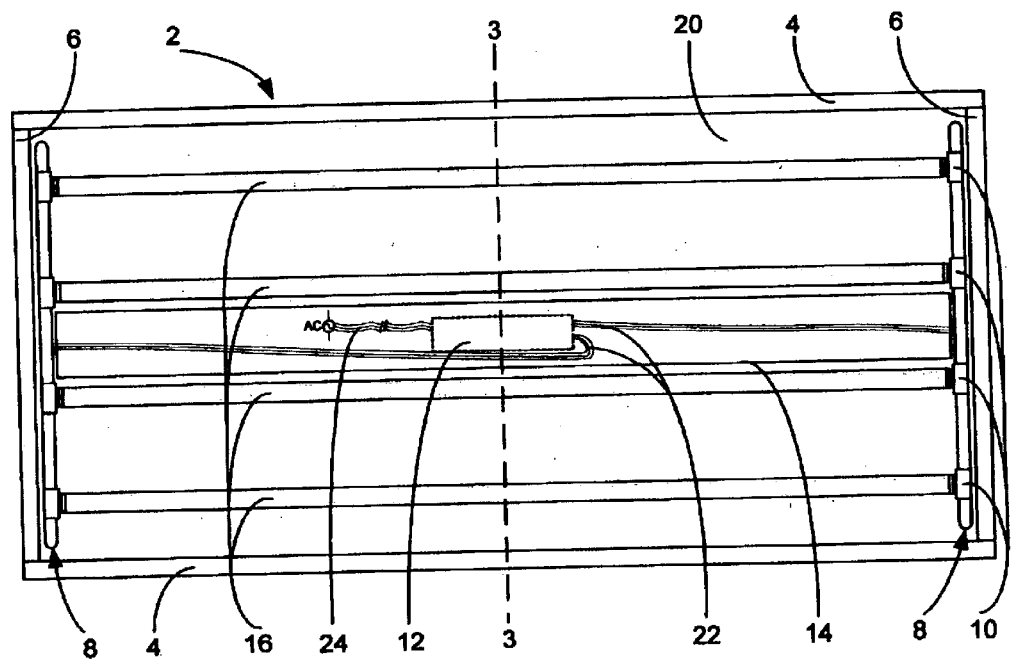
FIG. 1 is a plan view of the lighted surface of a typical prior art fluorescent luminaire.
Figure 2:
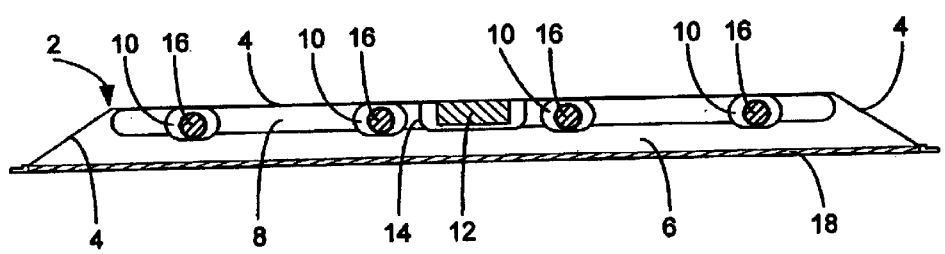
FIG. 2 is a cross section, through line 3—3, of the fluorescent luminaire of FIG. 1.

Although the LED retrofit method is of primary importance to the current invention, an understanding of fluorescent luminaires is valuable. The fundamental parts of a fluorescent luminaire will be described from the top down, and then the method of retrofitting a fluorescent luminaire will be described. FIGS. 1 and 2 exemplify a typical prior art fluorescent luminaire 2 similar to those commonly used as the primary source of illumination in many commercial applications, such as office buildings. For purposes of demonstration the drawings show troffers, which are the recessed style fluorescent fixtures most often associated with suspended ceilings in office buildings, but the present invention is intended for use with any of the commonly used fluorescent luminaires. A fluorescent luminaire typically includes a fixture housing 4 with endplates 6, socket bars 8 with lampholders 10, a ballast 12, a wireway cover 14, fluorescent lamps 16, and frequently a light-redirecting device 18 such as a louver or diffuser. Within the lighting industry, terminology is not very consistent from manufacturer to manufacturer, so it is necessary to establish the meaning of the various terms used in this detailed description.

A fluorescent luminaire 2, or luminaire, is any complete lighting fixture that uses at least one fluorescent lamp 16. The most common styles of fluorescent luminaires are troffers, surface boxes (including wraparounds), wallwashers, direct/indirects, strip lights, and task lights. The most common methods of mounting fluorescent luminaires are surface, pendant, lay-in or flanged. A reference to a method of mounting should not be construed as a limitation. The present invention is primarily directed at retrofitting luminaires that use lamp types T8 or T12, such as those manufactured by G.E., Westinghouse or Sylvania. FIGS. 1 and 2 show a fluorescent luminaire having four T-12 lamps. With the disclosure contained in this detailed description, one skilled in the art will also be able to similarly retrofit a luminaire that uses lamp type T5, T6, TT, or other common fluorescent lamp. As a note, a T12 is simply a fluorescent lamp with a 12/8-inch diameter tube, a T8 is a fluorescent lamp with an 8/8-inch diameter tube, etc., and a TT is a twin-tube fluorescent lamp.

A fixture housing 4 is the body of a fluorescent luminaire 2. The fixture housing includes two endplates 6, which are usually permanently mounted to opposing ends (of the length) of the fixture housing. The fixture housing and endplates generally enclose a fixture cavity 20.

Socket bars 8 attach to the fixture housing 4, usually being removeably mounted to the endplate lighted surfaces. The socket bars are used to support lampholders 10 that supply power and properly hold fluorescent lamps 16 in an aligned position within the fixture cavity 20. A tombstone is an assembly comprised of a socket bar, lampholders and at least some wiring. The supplied power to each tombstone is delivered through fixture wires 22 that extend from the ballast 12. The ballast is, more or less, a transformer that receives power from supply wires 24 that extend from an A/C power supply that is protected by either a fuse or circuit breaker. The wireway cover 14 is removeably mounted to the housing lighted surface of the fixture housing to conceal wires and to conceal the ballast if it is mounted inside the fixture cavity. Sometimes, the wireway cover is referred to as a ballast cover, ballast shield or channel cover.

Various light-redirecting devices 18 are often used to alter the light flow from a fluorescent luminaire 2. Examples of such devices include louvers (usually a pattern of baffles that create cells—white or metallic "Egg Crate" louvers are the most common) and diffusers (which are translucent lenses). Additionally, the housing lighted surface of most fixture housings 4 is highly reflective to maximize the light output from the fluorescent lamps 16.

Whichever style of fluorescent luminaire 2 is being retrofitted should be stripped. A fluorescent luminaire is stripped using the following, or similar, steps: Turn off the A/C power supply at the circuit breaker; follow all removal steps that are normally followed when removing old lamps and faulty ballasts (such as dropping the diffuser, removing all fluorescent lamps, removing the wireway cover, and removing any ballasts); cap off the loose supply wires that extend from the A/C power supply and insure that the ground is secured to the fixture housing; and remove the tombstones.

FIGS. 3 through 7 show two preferred embodiments of the present invention, which use a novel LED retro-reflector 26 or 27, as they would be used with a common commercial troffer. Where reference numbers in one figure are the same as another figure, those reference numbers carry substantially the same meaning. Preferred sizes, materials and methods of attachment will be discussed, but these preferences are not intended to exclude other suitable or functionally equivalent sizes, materials or methods of attachment. Also, a method of attachment shown in one of the embodiments may be similarly used in another embodiment.

An LED retro-reflector 26 or 27 is a thin sheet of substantially rigid material, such as twenty gauge mild steel. Other suitable materials include plastic, aluminum, polyester, fiberglass, nylon, vinyl, carbon fiber materials, polycarbonate, or other composite materials that offer some flexibility, but are substantially impervious to fracturing. There must be enough flexibility in the thin sheet so that stiff hand pressure will cause the rigid layer to adequately flex and allow easy installation of the LED retro-reflector, but the thin sheet must be rigid enough so that the LED retro-reflector maintains its installed shape and doesn't deform or shift around after installation is completed. The thickness of the thin sheet will usually be between ten and seventy-five thousandths of an inch, but will depend upon the material that is used.

The LED retro-reflector 26 or 27 preferably has a highly reflective coating, such as the white coating used on many fixture housings. Alternatively, a reflective white overlay may be fixed, such as by adhesive, to the retro-reflector's lighted surface. If steel is used, the LED retro-reflector should be protected against rust.

As shown in FIGS. 3, 4, 6 and 7, the LED retro-reflectors 26 and 27 are most preferably designed as universal-fit sheets that will easily install into most of the common fluorescent luminaire, once a fluorescent luminaire has been stripped as previously described. For substantially different sizes of luminaires, it is necessary to use an appropriately sized universal-fit LED retro-reflector, such as a universal-fit 2×4 foot, 2×2 foot, or 1×4 foot luminaires. The universal-fit LED retro-reflectors are preferably rectangular in shape. For purposes of demonstration, but not limitation, FIGS. 1 through 4, 6 and 7 are 2×4 foot luminaires.

Figure 3:
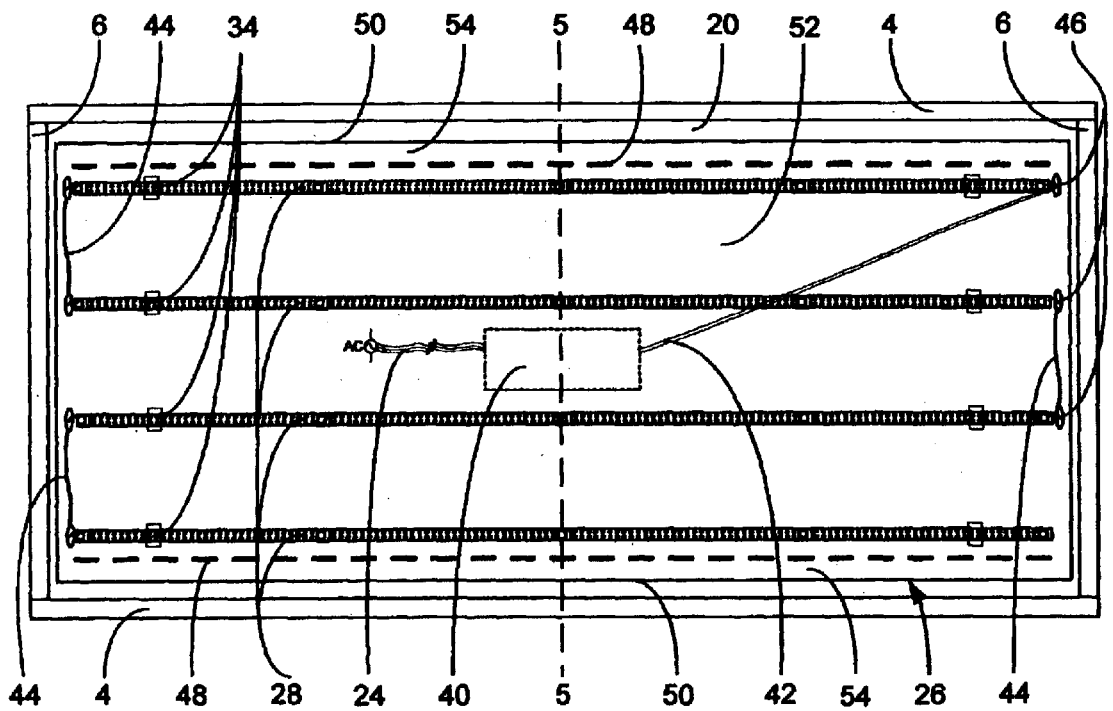
FIG. 3 is a plan view of the lighted surface of an LED luminaire according to the present invention.
Figure 4:
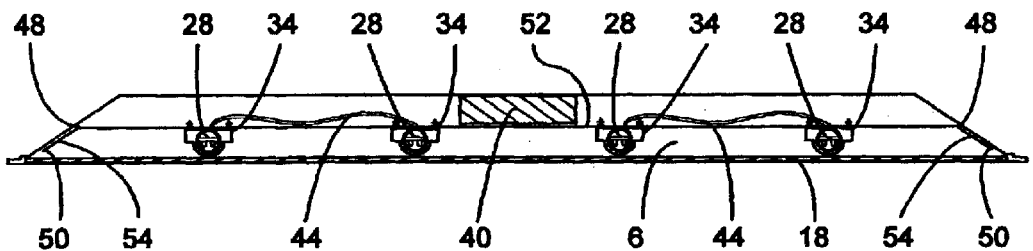
FIG. 4 is a cross section, through line 5—5, of the LED luminaire of FIG. 3.
Figure 5:
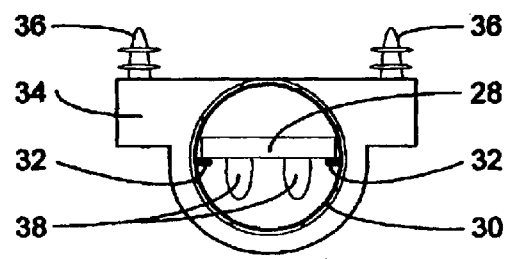
FIG. 5 is a close-up cross section of an LED light strip mounted inside a plastic tube, along with a tube clamp, similar to the assemblies shown in FIGS. 3 and 4.

An appropriate number of LED light strips 28, which are multiple LED lamp assemblies, are mounted to an LED retro-reflector to provide the desired illumination. FIGS. 3, 4, 6 and 7 show four multiple LED lamp assemblies in place of the four fluorescent lamps shown in FIGS. 1 and 2. The retrofit could have just as easily used two, three, five, or any desired number of multiple LED lamp assemblies. As shown in FIGS. 3 through 5, a first suggested method of mounting LED light strips to an LED retro-reflector is to use clear acrylic plastic tubes 30, having center guides 32, and tube clamps 34 that secure to the LED retro-reflector with tube fasteners 36. The plastic tubes provide the additional benefit of protecting the LED lamps 38 from damage during shipping; the center guides prevent rotation of LED light strips inside the plastic tube so that the plastic tubes may be positioned for the most desired light distribution; and the tube clamps, preferably snap-fit keepers or captive guides made from a clear plastic, make it possible to easily assemble the plastic tubes on-site to an LED retro-reflector. Additionally, packaging and shipping costs can be substantially reduced if numerous LED retro-reflectors are stacked and boxed separately from all of the required LED light strips that are in plastic tubes.

Tube clamps, similar to the one shown in FIG. 5, may alternatively be fastened to an LED retro-reflector by twisting or sliding the base of a tube clamp under raised tabs formed on the LED retro-reflector. The raised tabs are L-shaped cuts that have been stamped away from the retro-reflector's lighted surface to create raised rectangular structures. The raised tabs' shadowed surfaces lie in a plane that is adequately spaced from the retro-reflector's lighted surface so that the base of each tube clamp may slide between two raised tabs and the LED retro-reflector. For a tube clamp to twist-fit, the L-shaped cuts should oppose each other (⌐ ⌊). For a tube clamp to slide-fit, the L-shaped cuts should mirror each other (⌋ ⌊). The plastic tubes are slipped through the ring portion of tube clamps after the tube clamps have been attached to the LED retro-reflector.

Figure 6:
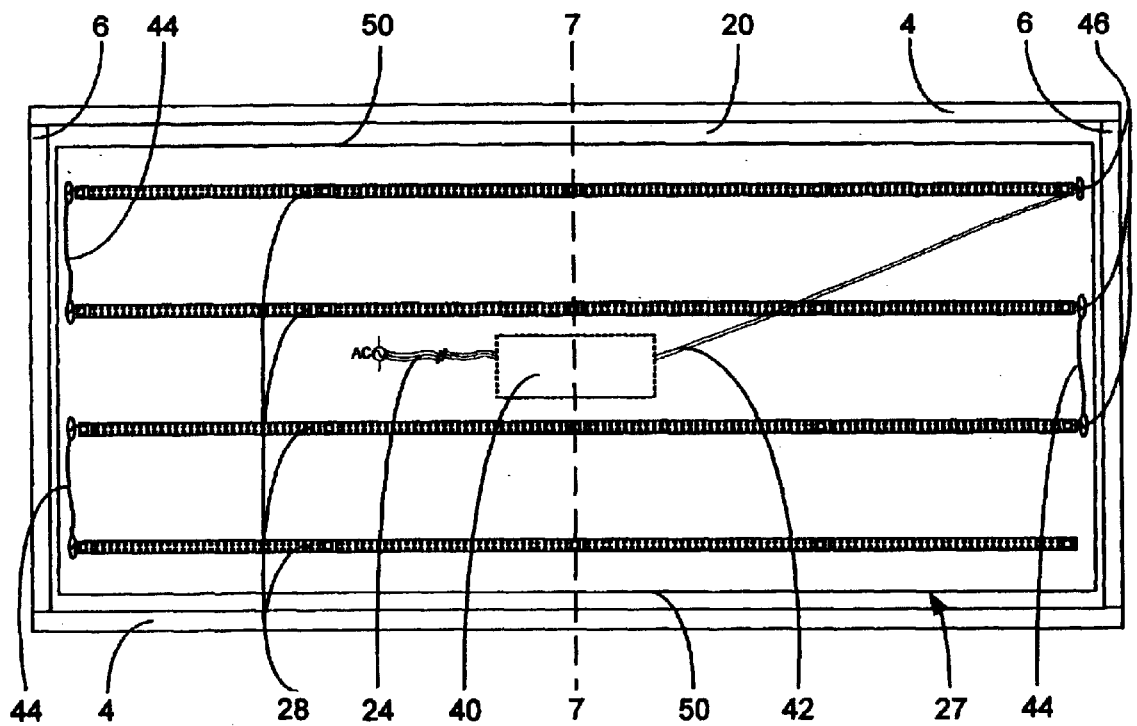
FIG. 6 is a plan view of an alternative embodiment of an LED luminaire according to the present invention.
Figure 7:
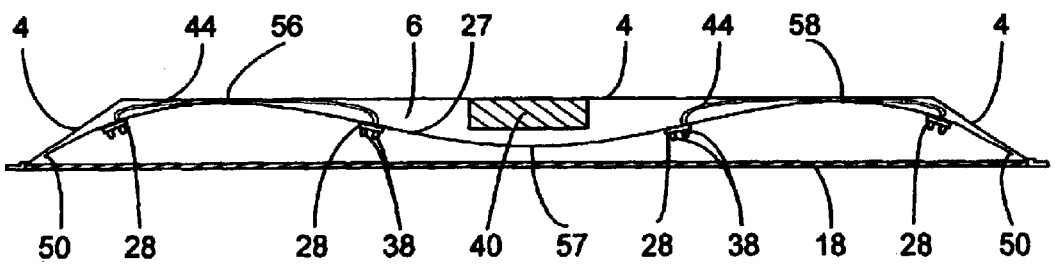
FIG. 7 is a cross section, through line 7—7, of the LED luminaire of FIG. 6.

A second suggested method of mounting LED light strips 28, as shown in FIGS. 6 and 7, is to attach pre-manufactured PCB light strips directly to the LED retro-reflector's lighted surface. For this method, the LED retro-reflector must be made from a non-conductive material, such as plastic. The PCB (printed circuit board) light strips, such as the Model LS1002W dual row LED light strips or the LS1001W single row LED light strips manufactured by Boca Flasher Corporation, may be secured using rivets, preformed tabs in the LED retro-reflector that sufficiently hold the free edges of the PCB material, or other suitable method for securing a PCB.

The LED light strips 28 receive power from an LED power supply 40 that is mounted to the fixture housing 4 with two or more self-tapping screws. The most preferred location for the power supply is at the midway of any width of the fixture housing, this usually being where the old ballast was located. The LED power supply has two A/C in electrical leads, hot and neutral, that are electrically connected, usually like color to like color, to the previously capped off supply wires 24 that extend from the A/C power supply. The LED power supply also has two D/C out electrical leads 42 that are preferably joined to a female electrical connector. The female connector mates to a male connector on, or in electrical connection with, a first LED light strip. A second LED light strip may be connected in series to the first LED light strip, and so on. Jumpers 44 with connectors are used to span distances between LED light strips, when necessary. To hold and hide the jumpers, an LED retro-reflector should include apertures 46 that are large enough to allow for the passage of jumper connectors.

Once the LED power supply 40 is in electrical connection with all of the mounted LED light strips 28, the LED retro-reflector is flexed into position and fastened to the fixture housing 4 using at least four self-tapping screws. The LED power supply, along with most of the wiring, will be concealed by the LED retro-reflector. The A/C power supply should be turned on at the breaker. Any louver or diffuser of the luminaire is replaced to complete the retrofit.

In a first preferred embodiment of the LED retro-reflector, shown in FIGS. 3 and 4, two easy-to-bend structures 48 have been incorporated into lengths of the LED retro-reflector 26. A length of an LED retro-reflector is defined as that dimension which is parallel to the longest LED light strip mounted to the LED retro-reflector. The overall length and width of the flat sheet used to make an LED retro-reflector for a 2×4 foot troffer is most preferably about 46 inches by 21 inches, respectively. For a broader range of applications, a universal-fit LED retro-reflector may be slightly smaller, such as 45½ inches by 20½ inches, so that it will easily fit virtually any 2×4 foot troffer. It is understood that it may be desirable to precisely size the length and width, and pre-bend the easy-to-bend structures, so that the LED retro-reflector exactly fits into a particular luminaire.

The easy-to-bend structures 48 shown in FIGS. 3 and 4 may be debosses, creases, perforations, rows of slits, paired rows of staggered slits, or the like. The easy-to-bend structures are preferably one to three inches, most preferably about two inches, in from each of the opposing edges 50 of the LED retro-reflector 26. The easy-to-bend structures are bent to create a large flat area 52 with two long flaps 54 that are folded in toward the LED retro-reflector's lighted surface. Additionally, if desired, wavy patterns and/or channels may be formed into lengths of the flat sheet, adjusting the width of the sheet accordingly, to accomplish various lighting affects and aesthetics.

The large flat area 52 of the LED retro-reflector 26 will lie substantially in the same plane as any light-redirecting device 18 of the luminaire. On average, about 1 to 2 inches of the depth of the fixture cavity 20 will lie between the LED retro-reflector and the fixture housing 4, and about 1 to 1½ inches of the depth of the fixture cavity will lie between the LED retro-reflector's lighted surface and any light-redirecting device of the luminaire. The volume of the fixture cavity that lies between the LED retro-reflector's shadowed surface and the fixture housing is needed to house the LED power supply 40.

FIGS. 6 and 7 show a second preferred embodiment of the LED retro-reflector that uses a bowed LED retro-reflector 27. The bowed LED retro-reflector is mounted within the fixture housing 4 such that there are three shallow inflections 56, 57 and 58 in the LED retro-reflector, rather than having any easy-to bend structures. When mounted, the middle inflection 57 is farthest from the fixture housing, thereby leaving plenty of volume to mount the LED power supply 40 somewhere between the middle inflection and the fixture housing. The length and width of the bowed LED retro-reflector is most preferably about 46 inches by 22 inches, respectively. Because the bowed design allows the LED retro-reflector to self-form within a fixture housing, there is considerably more ability to adjust the width before fastening the opposing edges 50 to the fixture housing.

An alternative embodiment, a combination of the first preferred embodiment and the second preferred embodiment, has three inflections. The middle inflection is shallow, as in the second preferred embodiment, but the other two inflections are easy-to-bend structures, as in the first preferred embodiment. Any of the suggested methods of mounting LED light strips to the LED retro-reflector may be used.

While a preferred form of the invention has been shown and described, it will be realized that alterations and modifications may be made thereto without departing from the scope of the following claims. For example, advances in white LED technologies are anticipated. As such, light strips may soon be replaced with another LED arrangement that could easily be adapted for use with the present invention. Also, as white LEDs become more powerful, it may be necessary to use a different diffuser and/or louver than those commonly used in a fluorescent luminaire.

What is claimed is:

1. A method for retrofitting a fluorescent luminaire into an LED luminaire that uses LED (light emitting diode) lamps, comprising the steps of:
   fabricating an LED retro-reflector using a thin sheet of substantially rigid material that is substantially impervious to fracturing, yet capable of being flexed by an applied hand pressure;
   mounting a first multiple LED lamp assembly to a lighted surface of the LED retro-reflector;
   substantially removing any louvers or diffusers of the fluorescent luminaire;
   stripping the fluorescent luminaire to expose a fixture housing having opposing endplates, the volume inside the fixture housing substantially defining a fixture cavity;
   mounting an LED power supply to the fixture housing;
   electrically connecting the LED power supply to an A/C power supply;
   manipulating the LED retro-reflector so it fits within the fixture cavity;
   electrically connecting the first multiple LED lamp assembly to the LED power supply; and
   fastening the LED retro-reflector to the fixture housing such that the LED retro-reflector substantially fits inside the fixture cavity and conceals the LED power supply;
   replacing any louvers or diffusers.

2. The method of claim 1 further comprising the steps of:
   forming apertures in the LED retro-reflector;
   mounting at least one additional multiple LED lamp assembly to the lighted surface of the LED retro-reflector; and
   electrically connecting the at least one additional multiple LED lamp assembly in series to the first multiple LED lamp assembly with a jumper that passes through the apertures formed in the LED retro-reflector.

3. The method of claim 2 wherein the multiple LED lamp assemblies are LED light strips.

4. The method of claim 3 further comprising the steps of:
fabricating clear plastic tubes that substantially house the LED light strips, the plastic tubes having center guides for aligning the LED light strips within the plastic tubes;
inserting the LED light strips into the plastic tubes; and
wherein the steps of mounting the first and additional multiple LED lamp assemblies are characterized by using tube clamps that mount the plastic tubes to the LED retro-reflector using tube fasteners.

5. The method of claim 3 further comprising the steps of:
fabricating clear plastic tubes that may substantially house the LED light strips, the plastic tubes having center guides for aligning the LED light strips within the plastic tubes;
inserting the LED light strips into the plastic tubes; and
wherein the step of fabricating the LED retro-reflector is characterized by forming sets of raised tabs in the thin sheet that are spaced along lengths of the LED retro-reflector; and
the steps of mounting the first and additional multiple LED lamp assemblies are characterized by using tube clamps that mount the plastic tubes to the LED retro-reflector when part of each tube clamp is inserted between a set of raised tabs and the thin sheet.

6. The method of claim 1 further comprising the step of forming at least two easy-to-bend structures in the LED retro-reflector, the easy-to-bend structures being formed between 1 and 3 inches from opposing edges of the LED retro-reflector such that the LED retro-reflector may be bent to create a large flat area with long flaps that include the opposing edges.

7. The method of claim 1 further comprising the step of bending the LED retro-reflector to create at least three inflections, a middle inflection of the at least three inflections being shallow and farther from the fixture housing than other of the at least three inflections.

8. The method of claim 3 wherein the step of mounting the multiple LED lamp assemblies is characterized by fastening the LED light strips directly to the lighted surface of the LED retro-reflector, and wherein the step of fabricating the LED retro-reflector uses a substantially rigid material that is nonconductive.

9. A retrofit kit, for converting a fluorescent luminaire into an LED luminaire that uses white LED (light emitting diode) lamps, comprising:
a first multiple LED lamp assembly;
an LED retro-reflector made from a thin sheet of substantially rigid material that is substantially impervious to fracturing, yet flexible by an applied hand pressure, the LED retro-reflector having a lighted surface that substantially displays the LED lamps;
an LED power supply;
a means for electrically connecting the LED power supply to an A/C power supply;
a means for electrically connecting the first multiple LED lamp assembly to the LED power supply;
a means for mounting the LED power supply to the fluorescent luminaire being converted; and
a means for mounting the LED retro-reflector to the fluorescent luminaire being converted.

10. The retrofit kit of claim 9 further comprising:
at least one additional multiple LED lamp assembly; and
a jumper for electrically connecting the at least one additional multiple LED lamp assembly in series to the first multiple LED lamp assembly.

11. The retrofit kit of claim 10 wherein the multiple LED lamp assemblies are LED light strips.

12. The retrofit kit of claim 11 further comprising:
clear plastic tubes that substantially house the LED light strips, the plastic tubes having center guides for aligning LED light strips within each of the plastic tubes; and
a means for fastening the plastic tubes to the LED retro-reflector.

13. The retrofit kit of claim 12 wherein the means for fastening the plastic tubes is with tube clamps that attach to the LED retro-reflector using tube fasteners.

14. The retrofit kit of claim 12 wherein the LED retro-reflector further comprises sets of raised tabs formed in the thin sheet that are spaced along lengths of the LED retro-reflector; and the means for fastening the plastic tubes is with tube clamps that mount to the LED retro-reflector when part of each tube clamp is inserted between a set of raised tabs and the thin sheet.

* * * * *